Jan. 20, 1953 M. W. GUYER 2,626,131
SLURRY DISTRIBUTOR FOR SEED TREATERS
Filed June 13, 1949
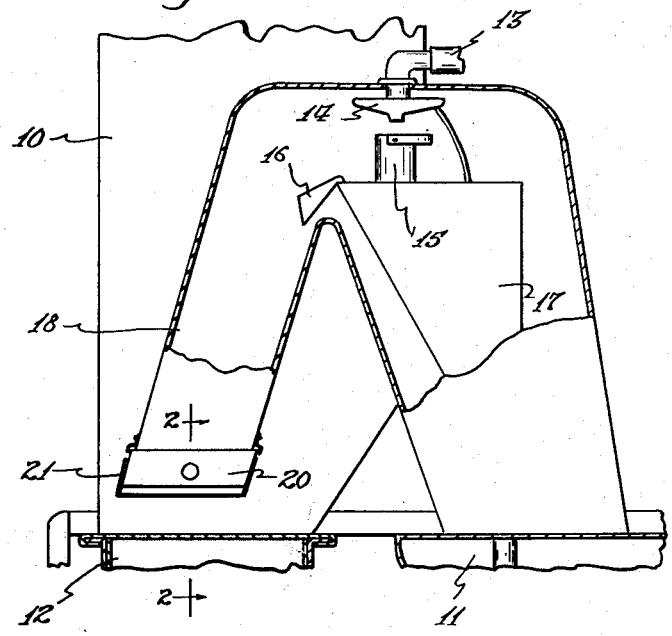
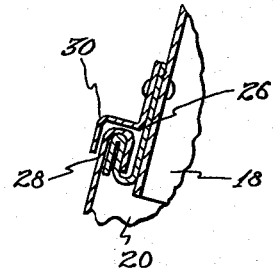
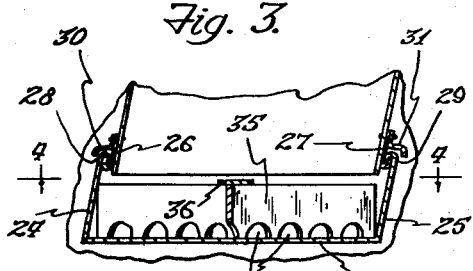
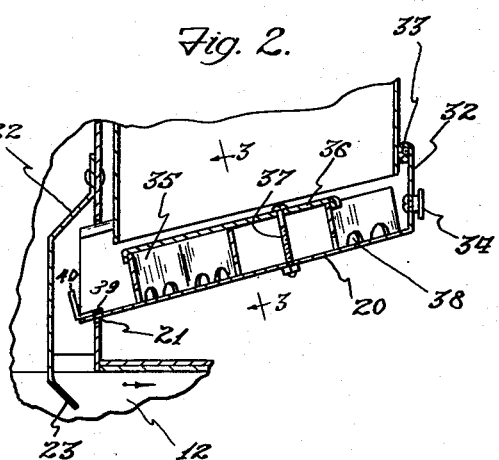
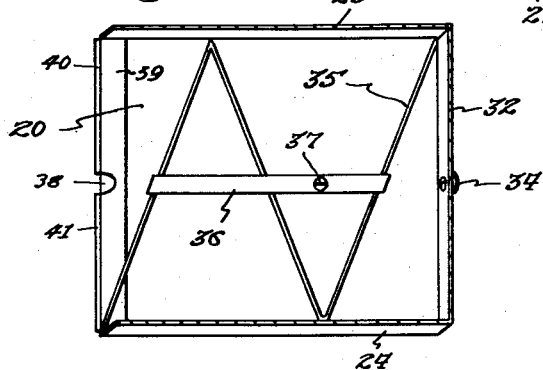
INVENTOR.
Morris W. Guyer
BY Greek Wells
Atty Patented Jan. 20, 1953

2,626,131

UNITED STATES PATENT OFFICE 2,626,131

SLURRY DISTRIBUTOR FOR SEED TREATERS

Morris W. Guyer, Spokane, Wash., assignor to Calkins Manufacturing Company, Spokane, Wash., a corporation of Washington Application June 13, 1949, Serial No. 98,833

6 Claims. (Cl. 259—18)

The present invention relates to improvements in a slurry distributor for seed treaters.

In my prior application, Serial No. 787,134, filed November 20, 1947, a seed treating machine of the general character to which my invention applies is illustrated. It is the principal purpose of the present invention to provide an improved slurry distributing device whereby the slurry which is measured in a measuring cup and dumped as a measured batch, is caused to spread out and drop a little at a time into the mixing trough so that the seeds get a more even distribution of the slurry. The amount of chemical which is used to treat the seeds is extremely small and even when it is diluted by an inert powder and then mixed into a slurry it requires only a few cubic centimeters of the slurry for several pounds of seeds.

In my prior application, mechanism is provided whereby the slurry is measured in proportion to the amount of seed added to the mixing chamber but in the mixing chamber the mixing is carried on continuously and the seed is advanced through the mixing chamber as the mixing takes place. With my present invention the slurry is measured in proportion to the seed as before and the distributor causes the slurry to be delivered into the mixing trough across a substantial width of the trough and at a rate proportioned to the seed thereunder so that a greater number of the seeds will initially receive the falling slurry and thus make it easier for the slurry to be distributed to all of the seeds.

More particularly it is the purpose of my invention to provide a slurry distributor of the character described which includes a spreading trough baffled to cause the slurry to flow over the trough and drip off the lower edge of the trough at several places. The trough is so mounted that it is readily removable for cleaning and when it is removed, permits access to the slurry dumping channel so that these parts may also be readily cleaned. The slurry is dumped into the baffled distributing trough immediately upon dumping each batch of seed into the mixing trough and the initial surge of seed receives an initial, relatively heavy charge of slurry. Thereafter the flow of slurry is reduced as the batch of seed is worked forward by the mixer.

The nature and advantages of my invention will appear more fully from the following description and the accompanying drawings wherein a preferred embodiment is shown. The drawings and description are illustrative only, however, and various modifications may be made in the details of construction without departing from the scope of the invention as defined in the claims.

In the drawings:

Figure 1 is a side view of a portion of the seed treating machine to which my invention is applied, the slurry tank and the mixing trough being shown in section and parts of the slurry distribution casing being broken away to illustrate the slurry mixing mechanism;

Figure 2 is a sectional view taken substantially on the line 2—2 of Figure 1;

Figure 3 is a sectional view taken on the line 3—3 of Figure 2;

Figure 4 is a sectional view taken on the line 4—4 of Figure 3; and

Figure 5 is an enlarged fragmentary sectional view illustrating the type of construction used for mounting the sliding distributor.

Referring now in detail to the drawings, Figure 1 illustrates generally the slurry distributing mechanism of a seed treater such as that shown in my prior application. The seed hopper is indicated at 10. The slurry tank is shown in part at 11 and the mixing chamber is shown at 12. As described in the prior application identified above, slurry is pumped from the tank 11 through a hose 13 into a bowl 14 which empties into a measuring cup 15. The measuring cup 15 is filled to overflowing by the steady stream of slurry and periodically it is dumped over a dumping lip 16 in response to the feeding of a batch of seed from the hopper 10 to the mixing chamber 12. The overflow of slurry from the cup 15 is directed downwardly by the member 17 and returned to the slurry tank 11. The parts thus far described are shown and claimed in the prior application referred to above.

The present invention is directed to a novel device which is attached to the lower end of the tubular channel 18 into which the slurry is directed by the pouring spout 16. It will be appreciated that when the cup 15 is dumped, the slurry will flow down the sides of the channel 18 and some of it will fall directly to the bottom of the channel without striking the sides, in fact the channel 18 is set at an angle to the vertical to create this effect so that most of the slurry will be delivered in a batch to the bottom of the channel 18.

In order to distribute the slurry more evenly to the seeds in the mixing chamber 12, I mount a removable distributor trough 20 on the bottom end of the channel 18. This distributor trough 20 extends horizontally across the bottom of the channel 18 but slopes downwardly from the front face of the channel 18 toward the hopper 10. An aperture 21 in the hopper wall permits the trough 20 to extend through the wall but a shield 22 on the inside of the hopper wall prevents the seeds in the hopper from coming in contact with the trough 20. The shield 22 extends downwardly into the mixing chamber 12 and has a deflector edge 23 bent at an angle of about forty-five degrees to the vertical in the direction of the movement of the seeds in the mixing chamber 12.

The trough 20 has its side walls 24 and 25 parallel and aligned with the corresponding walls of the channel 18. Guide strips 26 and 27 are provided on the exterior surface of the channel 18 and are turned up to provide channels in which the hooked upper edges 28 and 29 of the trough 20 slide. To prevent dirt, seeds and the like from getting into the sliding connection which consists of the parts 26, 27, 28 and 29, shielding strips 30 and 31 are mounted on the channel 18 and extend out and down to overlap the sliding joints.

The front wall 32 of the trough 20 is beaded as indicated at 33 and forms a stop to limit the extent to which the trough can slide downwardly along the inclined lower end of the channel 18. A handle 34 is provided on the end wall 32.

A baffle member 35, which is composed of a strip of metal bent to substantially Z-shape, is set in the trough 20 and secured in position by a holding strap 36 that is bolted down by a screw bolt 37. The baffle member 35 has its lower edge provided with a multiplicity of small semi-circular recesses 38 so that slurry dumped into the trough 20 will flow along and through the baffle member 35 and be distributed all the way across the trough 20 by the time it reaches the lower edge thereof. At the lower edge of the bottom of the trough 20, I provide a raised barrier with slot 38 at the center. The barrier is made of a metal strip having a base portion 39 secured to the bottom of the trough 20 and portions 40 and 41 bent upward at right angles to the base portion 39. When the slurry is dumped into the trough 20 the initial charge flows over the portions 40 and 41 as well as through the slot 38. The slurry trapped by the baffle member 35 flows out through the slot 38 and drips off the lower edge of the trough, spreading along this lower edge. Any slurry that strikes the lip 23 will of course, be drained off this lip and wiped off by the seed as the seed is advanced along the mixing chamber and agitated.

It is believed that the nature and advantages of my invention will be clear from the foregoing description. Having thus described my invention, I claim:

1. In a seed treater, a tubular slurry delivery channel into which slurry is poured and a distributing trough at the lower end thereof, said trough having its bottom horizontal in one direction and inclined downwardly in a direction at right angles thereto, and a Z-shaped baffle strip in the trough extending across the trough transversely to the direction of inclination of the trough.

2. In a seed treater, a tubular slurry delivery channel into which slurry is poured and a distributing trough at the lower end thereof, said trough having its bottom horizontal in one direction and inclined downwardly in a direction at right angles thereto, a Z-shaped baffle strip in the trough extending across the trough transversely to the direction of inclination of the trough, the strip having its bottom edge provided with spaced recesses for distributing the slurry flow across the bottom of the trough.

3. In a seed treater having a mixing chamber in which seed and slurry are mixed, means to distribute slurry into said chamber comprising a trough over said chamber having its bottom inclined to the horizontal and open to the chamber along its lower edge, so the slurry may drip into the mixing chamber, and a barrier across the lower edge of said trough provided with a slot.

4. In a seed treater having a mixing chamber in which seed and slurry are mixed, means to distribute slurry into said chamber comprising a trough over said chamber having its bottom inclined to the horizontal and open to the chamber along its lower edge, so the slurry may drip into the mixing chamber, a seed shield spaced from said lower edge and extending above and below said trough to prevent seeds from getting in said trough and a baffle in said trough operable to delay the flow of part of the slurry poured into the trough, and spread it across the bottom of the trough as the slurry flows to the lower edge.

5. In a seed treater, a tubular channel having sides inclined to the vertical, into which the slurry is poured, the channel having an open lower end, a distributing trough having its bottom inclined to the horizontal and having sides inclined to the vertical overlapping and slidably suspended from the inclined channel sides, and cooperating members on the channel and trough removably securing the trough on the lower end of said channel.

6. In a seed treater, a tubular slurry delivery channel into which slurry is poured and a distributing trough at the lower end thereof, said trough having its bottom horizontal in one direction and inclined downwardly in a direction at right angles thereto, a Z-shaped baffle strip in the trough extending across the trough transversely to the direction of inclination of the trough, and a barrier strip extending across the lower edge of the trough, said strip being provided with a slot intermediate its ends.

MORRIS W. GUYER.

REFERENCES CITED

The following references are of record in the file of this patent:

UNITED STATES PATENTS

| Number | Name | Date |
| --- | --- | --- |
| 225,023 | Ranson | Mar. 2, 1880 |
| 1,554,071 | Downs | Sept. 15, 1925 |

FOREIGN PATENTS

| Number | Country | Date |
| --- | --- | --- |
| 112,757 | Germany | Aug. 8, 1899 |